United States Patent
Tsai et al.

(10) Patent No.: US 9,608,779 B2
(45) Date of Patent: Mar. 28, 2017

(54) METHODS OF DATA ALLOCATION AND SIGNAL RECEIVING, WIRELESS TRANSMITTING APPARATUS AND WIRELESS RECEIVING APPARATUS

(71) Applicant: Acer Incorporated, New Taipei (TW)

(72) Inventors: Tsung-Yu Tsai, New Taipei (TW); You-Hsien Lin, New Taipei (TW); Hsuan-Li Lin, New Taipei (TW); Terng-Yin Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/923,456

(22) Filed: Oct. 27, 2015

(65) Prior Publication Data
US 2017/0048030 A1    Feb. 16, 2017

(30) Foreign Application Priority Data
Aug. 13, 2015  (TW) .............................. 104126334 A

(51) Int. Cl.
H04L 5/00       (2006.01)
H04W 72/04      (2009.01)
H04L 27/26      (2006.01)

(52) U.S. Cl.
CPC ........ H04L 5/0007 (2013.01); H04L 27/2626 (2013.01); H04L 27/2653 (2013.01); H04L 27/2659 (2013.01); H04W 72/0453 (2013.01)

(58) Field of Classification Search
CPC ............... H04L 5/0007; H04L 27/2626; H04L 27/2653; H04L 27/2647; H04L 27/2655; H04L 27/2636; H04L 27/32; H04L 27/2601

(Continued)

(56) References Cited

U.S. PATENT DOCUMENTS 7,649,832 B2 *  1/2010  Egashira ............. H04L 27/2647
                                                      370/206
7,738,572 B2    6/2010  Lin
                    (Continued)

FOREIGN PATENT DOCUMENTS

CN      101478324      7/2009
CN      101478324      5/2012
              (Continued)

OTHER PUBLICATIONS

Adaptive subcarrier and power allocation for multiuser MIMO-OFDM systems Communications, 2005. ICC 2005. 2005 IEEE International Conference on, Issue Date: May 16-20, 2005, Written by: Chengkang Pan; Yueming Cai; Youyun Xu.*

Primary Examiner — Emmanuel Bayard
(74) Attorney, Agent, or Firm — Jianq Chyun IP Office

(57) ABSTRACT

Methods of data allocation and signal receiving, a wireless transmitting apparatus, and a wireless receiving apparatus are provided based on orthogonal frequency division multiplexing (OFDM) technology. The wireless transmitting apparatus obtains a data stream and allocates the data stream to a first sub-carrier set. Each of the first sub-carrier set and a second sub-carrier set has sub-carriers with opposite frequencies to each other, respectively. The second sub-carrier is emptied or allocated according the data stream allocated to the first sub-carrier set. The data stream is converted into an OFDM signal transmitted through a transmitting module. The wireless receiving apparatus includes a single branch receiver for receiving a radio frequency (RF) signal and outputting a baseband signal. Subsequently, the data stream is restored from the baseband signal.

12 Claims, 6 Drawing Sheets

(58) Field of Classification Search
USPC .................................................. 375/260, 295
See application file for complete search history.

(56) References Cited

U.S. PATENT DOCUMENTS

| | | | | |
|---|---|---|---|---|
| 8,040,790 B2* | 10/2011 | Ratnam | ................ | H04L 5/0007 370/208 |
| 8,094,553 B2* | 1/2012 | Akita | ..................... | H04L 5/023 370/230 |
| 8,331,482 B2* | 12/2012 | Wang | ................... | H04L 5/0007 375/295 |
| 8,520,777 B2* | 8/2013 | Lindoff | .................. | H04L 5/005 375/316 |
| 8,644,404 B2* | 2/2014 | Mashino | .............. | H04J 11/0066 375/260 |
| 2007/0171994 A1 | 7/2007 | Parker et al. | | |
| 2010/0246375 A1 | 9/2010 | Orlik et al. | | |
| 2012/0114079 A1 | 5/2012 | Cha et al. | | |
| 2014/0365848 A1* | 12/2014 | Roh | ................. | H03M 13/2966 714/784 |
| 2016/0164586 A1* | 6/2016 | Branlund | ................ | H04J 14/00 370/329 |

FOREIGN PATENT DOCUMENTS

| | | |
|---|---|---|
| CN | 102656855 | 9/2012 |
| WO | 2008061595 | 5/2008 |

\* cited by examiner sub-carrier index n

| n | |
|---|---|
| $\frac{N}{2}$ | $S_{\frac{N}{2}}$ |
| $\frac{N}{2}-1$ | $S_{\frac{N}{2}-1}$ |
| $\frac{N}{2}-2$ | $S_{\frac{N}{2}-2}$ |
| ⋮ | ⋮ |
| 2 | $S_2$ |
| 1 | $S_1$ |
| 0 | $S_0$ |
| −1 | $S_1^*$ |
| −2 | $S_2^*$ |
| ⋮ | ⋮ |
| $-\frac{N}{2}+2$ | $S_{\frac{N}{2}-2}^*$ |
| $-\frac{N}{2}+1$ | $S_{\frac{N}{2}-1}^*$ |

METHODS OF DATA ALLOCATION AND SIGNAL RECEIVING, WIRELESS TRANSMITTING APPARATUS AND WIRELESS RECEIVING APPARATUS

CROSS REFERENCE TO RELATED APPLICATION

This application claims the priority benefit of Taiwan application serial no. 104126334, filed on Aug. 13, 2015. The entirety of the above-mentioned patent application is hereby incorporated by reference herein and made a part of specification.

BACKGROUND OF THE INVENTION

1. Field of the Invention

The invention relates an orthogonal frequency division multiplexing (OFDM) technology, and particularly relates to a method of data allocation, a wireless transmitting apparatus using the same, a signal receiving method and a wireless receiving apparatus using the same based on the OFDM technology.

2. Description of Related Art

Owing to advantages such as having a better efficiency of the frequency spectrum, effectively coping with multipath channel, and having a high data transmission speed, the orthogonal frequency division modulation technology has been broadly used in relevant fields of communication such as digital television broadcasting, accessing the Internet of digital subscriber lines (DSL), and 4G mobile communication networks, etc.

FIG. 1 shows a conventional dual branch orthogonal frequency division multiplexing receiving device. Referring to FIG. 1, it is assumed that a receiving device 100 has two antenna units 111 and corresponding receivers 110 and 120. The following descriptions are based on the antenna unit 111 and the corresponding receiver 110. After being received by using the antenna unit 110, a radio frequency signal (Z1($t$)) is divided into two paths, i.e., an in-phase path (I-path) 150 and a quadrature-phase path (Q-path) 155.

In the in-phase path 150, the frequency mixer 112 performs a mixing process (i.e., multiplying $I_{LO_1}(t)=\cos(2\pi f_c t)$ by using a multiplier) based on a carrier frequency fc generated by an oscillation generator 113, and the signal is processed by a low pass filter (LPF) 116 and an analog-to-digital converter 118, so as to generate a baseband signal ($I_{BB1}(t)$) of the in-phase path 150. Besides, in the quadrature-phase path 155, a mixer 114 performs a mixing process based on the carrier frequency fc generated by the oscillation generator 113 and rotates the phase 90°+θ$_1$, then the signal is processed by an amplifier 115 with a gain g$_1$ (i.e., multiplying $Q_{LO_1}(t)=-g_1 \sin(2\pi f_c t+\theta_1)$ by using a multiplier) and processed by a low pass filter 117 and a analog-to-digital converter 119, so as to generate a baseband signal ($Q_{BB1}(t)$) of the quadrature-path 155. Then, the baseband signals ($I_{BB1}(t)$ and $Q_{BB}(t)$) are transmitted to a signal processing module 170 (e.g., a long term evolution (LTE) modem).

However, since the in-phase path and the quadrature-phase path are both present, the dual branch orthogonal frequency division multiplexing receiver usually faces an in-phase/quadrature-phase imbalance.

SUMMARY OF THE INVENTION

The invention provides a method of data allocation, a method of signal receiving, a wireless transmitting apparatus, and a wireless receiving apparatus. In the methods and apparatuses, data of sub-carriers are allocated by the wireless transmitting apparatus, and the wireless receiving apparatus has a single branch receiver to receive signals, so as to effectively solve an in-phase/quadrature-phase imbalance and provide a structure of a low-cost receiving apparatus.

A method of data allocation according to an embodiment of the invention is suitable for a wireless transmitting apparatus. The wireless transmitting apparatus transmits through a plurality of sub-carriers based on an orthogonal frequency division multiplexing (OFDM) technology. The method of data allocation includes steps as follows. A data stream is obtained. The data stream is allocated to a first sub-carrier set. All the sub-carriers are divided into the first sub-carrier set and a second sub-carrier set, and the first and second sub-carrier sets respectively have the sub-carriers with opposite frequencies to each other. Then, the second sub-carrier set is emptied or allocated based on the data stream allocated to the first sub-carrier set.

A wireless transmitting apparatus according to an embodiment of the invention is suitable for transmitting through a plurality of sub-carriers based on an orthogonal frequency division multiplexing technology. The wireless transmitting apparatus includes a transmitting module and a processing circuit. The transmitting module transmits an OFDM signal. The processing circuit is coupled to the transmitting module and configured to perform steps as follows. A data stream is obtained. The data stream is allocated to a first sub-carrier set. All the sub-carriers are divided into the first sub-carrier set and a second sub-carrier set, and the first and second sub-carrier sets respectively have the sub-carriers with opposite frequencies to each other. The second sub-carrier set is emptied or allocated based on the data stream allocated to the first sub-carrier set. Then, the data stream allocated to the first sub-carrier set and the second sub-carrier set are converted into an OFDM signal, so as to transmit the OFDM signal through the transmitting module.

A wireless receiving apparatus according to an embodiment of the invention is suitable for receiving through a plurality of sub-carriers based on an OFDM technology. The wireless receiving apparatus includes a receiving module and a processing circuit. The receiving module includes a single branch receiver that receives a radio frequency signal and outputs a baseband signal. All the sub-carriers are divided into the first sub-carrier set and the second sub-carrier set, and the radio frequency signal includes the OFDM signal carried by the first sub-carrier set and the second sub-carrier set, and the second sub-carrier set is emptied or allocated based on data of the first sub-carrier set. The processing circuit is coupled to the receiving module and configured to perform steps as follows. A data stream is restored from the baseband signal.

A method of signal receiving according to an embodiment of the invention is suitable for a wireless receiving apparatus. The wireless receiving apparatus receives through a plurality of sub-carriers based on an OFDM technology. The method of signal receiving includes steps as follows. A radio frequency signal is received through a single branch receiver and a baseband signal is generated. All the sub-carriers are divided into the first sub-carrier set and the second sub-carrier set, and the radio frequency signal includes the OFDM signal carried by the first sub-carrier set and the second sub-carrier set, and the second sub-carrier set is emptied or allocated based on data of the first sub-carrier set. Then, a data stream is restored from the baseband signal.

Based on above, in the method of data allocation and the wireless transmitting apparatus using the same and the method of signal receiving and the wireless receiving apparatus using the same according to the embodiments of the invention, the wireless transmitting apparatus empties a portion of the sub-carriers or allocates the portion of the sub-carriers based on the data of the other portion of the sub-carriers, so that the wireless receiving apparatus that receives by using the single branch receiver is able to effectively restore the data stream and prevent the in-phase/quadrature-phase imbalance and inter-carrier interference (ICI).

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
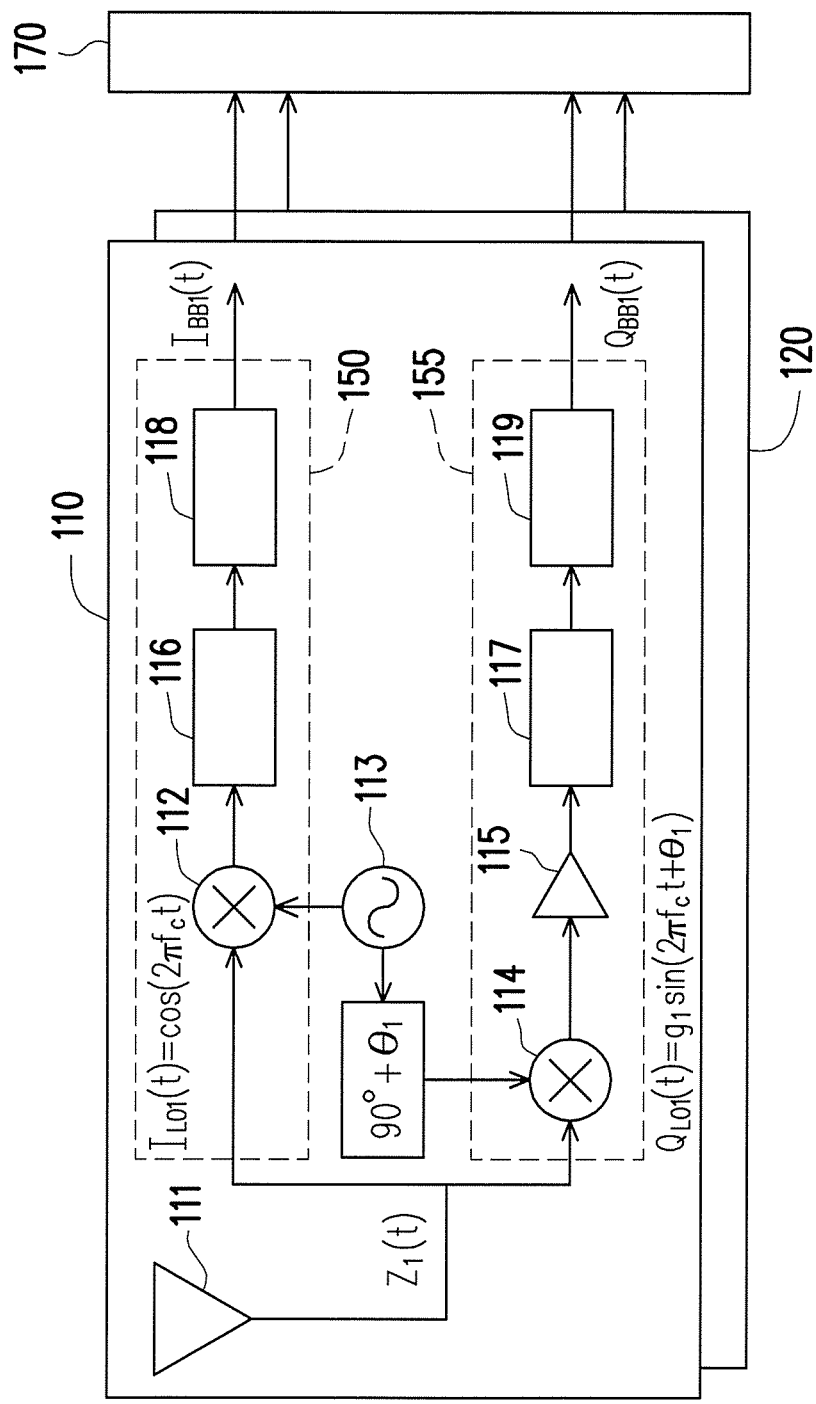
FIG. 1 shows a conventional dual branch orthogonal frequency division multiplexing receiver.

Reference will now be made in detail to the present preferred embodiments of the invention, examples of which are illustrated in the accompanying drawings. Wherever possible, the same reference numbers are used in the drawings and the description to refer to the same or like parts.

Compared with the conventional dual branch receiver, a single branch receiver has a lower cost and is capable of preventing in-phase/quadrature-path imbalance. However, when a dual path design (i.e., in-phase path and quadrature-phase path) is not used, there may be an inter-carrier interference (ICI) after a base signal undergoes a discrete Fourier transformation (DFT) of an orthogonal frequency division multiplexing (OFDM) receiving apparatus. The inter-carrier interference usually occurs between a positive sub-carrier index and a corresponding negative sub-carrier index. Taking a data signal carried by a sub-carrier n as an example, an interference to the data signal may result from a data signal carried by a sub-carrier –n. Accordingly, in the embodiments of the invention, a data allocation or a specific coding may be performed on a wireless transmitting apparatus, so as to eliminate the inter-carrier interference formed when the single branch receiver is used to receive an OFDM signal. In the following, a plurality of embodiments following the spirit of the invention are described in detail. People using these embodiments may suitably modify these embodiments based on the needs, and the invention is not limited to the descriptions in the following.

Figure 2:
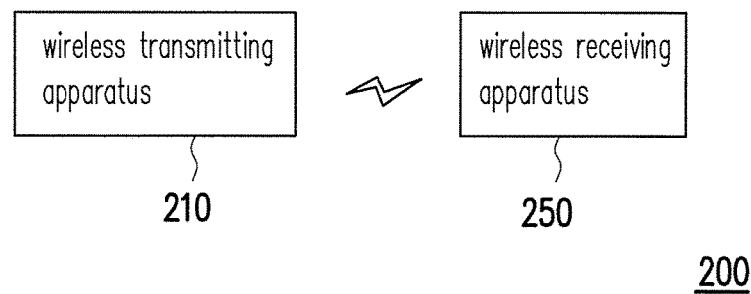
FIG. 2 is a schematic diagram illustrating a communication system according to an embodiment of the invention.

FIG. 2 is a schematic diagram illustrating a communication system according to an embodiment of the invention. Referring to FIG. 2, a communication system 200 includes a wireless transmitting apparatus 210 and a wireless receiving apparatus 250. The communication system 200 is compatible with a communication system based on the OFDM technology, such as a 4G mobile communication network, a wireless local access network (WLAN), or a digital television broadcast system. It should be noted that the communication system 200 may include one or more of the wireless transmitting apparatuses 210 and the wireless receiving apparatuses 250, and the invention is not limited by the numbers thereof.

The wireless transmitting apparatus 210 may be implemented by a variety of embodiments. For example, the wireless transmitting apparatus 210 may include, but is not limited to, a mobile station, an advanced mobile station (AMS), a user equipment (UE), a server, a client terminal, a desktop computer, a laptop computer, a network computer, a work station, a personal digital assistant (PDA), a tablet personal computer (PC), a scanner, a telecommunication apparatus, a pager, a camera, an access point, a television, a pocket video gaming apparatus, a music apparatus, a wireless sensor, etc.

Figure 3:
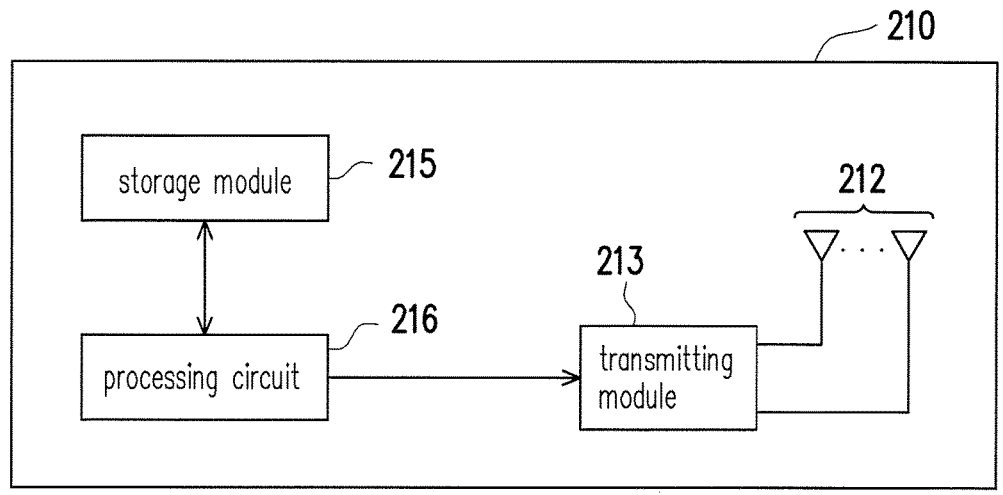
FIG. 3 is a block diagram illustrating a wireless transmitting apparatus according to an embodiment of the invention.

FIG. 3 is a block diagram illustrating the wireless transmitting apparatus 210 according to an embodiment of the invention. The wireless transmitting apparatus 210 may at least be represented by functional components shown in FIG. 3. The wireless transmitting apparatus 210 may at least include, but is not limited to, a transmitting module 213, a processing circuit 216, a storage module 215, and one or more antenna units 212. The transmitting module 213 transmits downlink signals wirelessly. The transmitting module 213 may also perform operations such as low-pass amplification, impedance matching, frequency mixing, up conversion, filtering, amplification, digital-to-analog conversion, and other similar operations. The transmitting module 213 may be integrated into a chip or implemented as an independent component or module, and the transmitting module may be implemented as hardware or software.

The storage module 215 may be a static or mobile random access memory (RAM), read-only memory (ROM), flash memory, hard drive, other similar apparatuses, or a combination of the aforesaid apparatuses.

The processing circuit 216 is configured to process digital signals and perfolin a method of data allocation according to an exemplary embodiment of the invention. In addition, the processing circuit 216 is coupled to the storage module 215 to store programming codes, configuration of apparatus, codebook, buffer or permanent data. In addition, the storage module 215 may also record a plurality of modules executed by the processing circuit 216. For example, the processing circuit 216 may load a digital signal processing module for signal processing such as generating data streams, coding, serial-to-parallel conversion and/or parallel-to-serial conversion, constellation mapping, modulating, adding pilot signals and/or guard interval, inverse Fourier transformation (e.g., fast Fourier transformation (FFT), discrete Fourier transformation (DFT)), etc. Alternatively, the processing circuit 216 may load a communication signaling processing module, so as to control signaling messages based on related communication technologies (e.g., WiFi, LTE, etc.).

The function of the processing circuit 216 may be implemented by using a programmable unit such as a microprocessor, a micro-controller, a digital signal processing (DSP) chip, a field programmable gate array (FPGA), etc. The function of the processing circuit 216 may also be implemented by using an independent electronic apparatus or an integrated circuit (IC). Besides, the processing circuit 216 may be implemented as hardware or software. It should be noted that, based on the design needs of people using the embodiments of the invention, the wireless transmitting apparatus 210 may have one or more processing circuits 216 to integrate or separately deal with the function of a modem and functions of sensing and displaying, etc. The invention does not intend to impose limitations in this regard.

Figure 4:
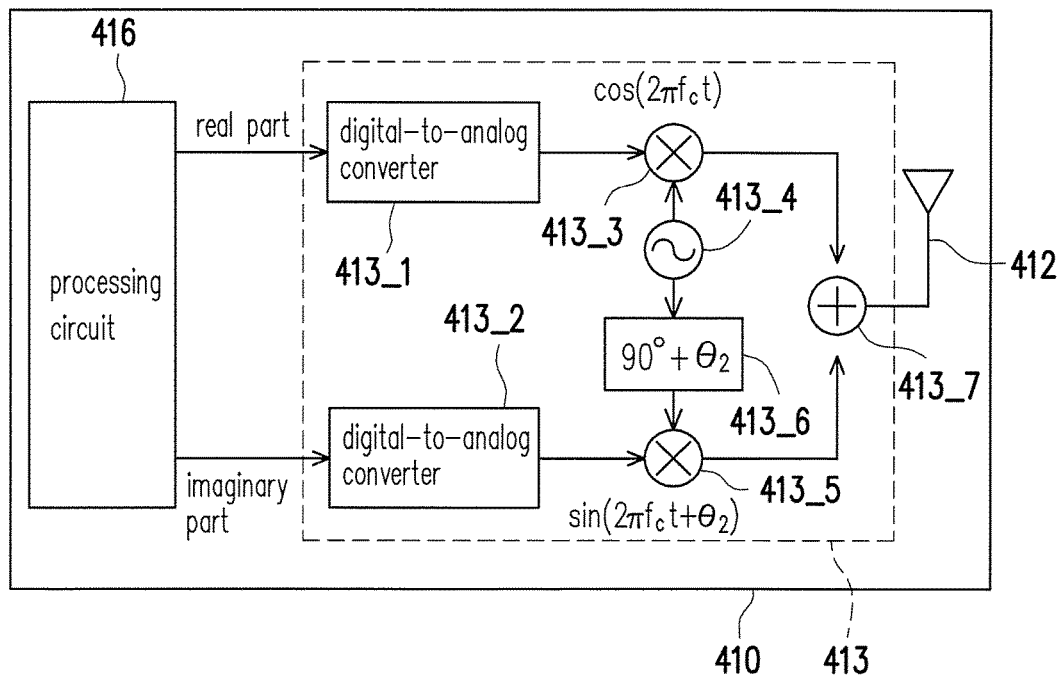
FIG. 4 is a schematic diagram illustrating a circuit of a wireless transmitting apparatus according to an embodiment of the invention.

FIG. 4 is a schematic diagram illustrating a circuit of a wireless transmitting apparatus according to an embodiment of the invention. Referring to FIG. 4, a wireless transmitting apparatus 410 includes an antenna unit 412, a transmitting module 413, and a processing circuit 416. The processing circuit 416 respectively outputs a real part and an imaginary part of a data stream to the transmitting module 413. The transmitting module 413 includes digital-to-analog converters 413_1 and 413_2, frequency mixers 413_3 and 413_5, an oscillation generator 413_4, a phase rotator 413_6 and a multiplexer 413_7. The real part and the imaginary part of the data stream are respectively converted by the digital-to-analog converters 413_1 and 413_2, and are up converted by the frequency mixer 413_3 and 413_5 based on a carrier frequency generated by the oscillation generator 413_4. In addition, the phase of the imaginary part is further rotated 90°+$\theta_2$ by the phase rotator 413_6. Then, the real part and the imaginary part of the data stream are emitted to an external environment after being multiplexed by the multiplexer 413_7.

It should be noted that the wireless transmitting apparatus 410 may also have a plurality of the antenna units 412 and corresponding transmitting modules 413. The invention does not intend to limit the numbers of the antenna unit 412 and the transmitting module 413.

Besides, the wireless receiving apparatus 250 may be implemented by a plurality of embodiments. For example, the wireless receiving apparatus 250 may include, but is not limited to, a mobile station, an advanced mobile station, a server, a client terminal, a desktop computer, a laptop computer, a UE, a network computer, a work station, a personal digital assistant, a tablet personal computer, a scanner, a telecommunication apparatus, a pager, a camera, an access point, a television, a pocket video gaming apparatus, a music apparatus, a wireless sensor, etc.

Figure 5:
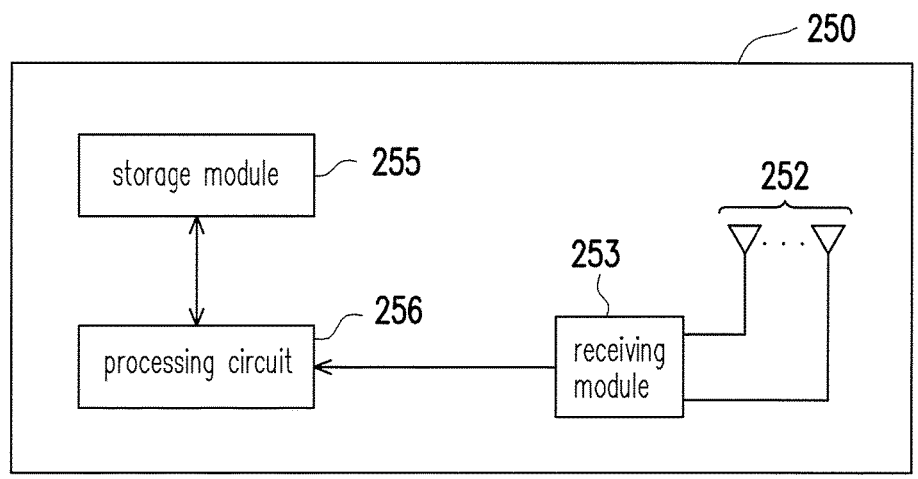
FIG. 5 is a block diagram illustrating a wireless receiving apparatus according to an embodiment of the invention.

FIG. 5 is a block diagram illustrating the wireless receiving apparatus 250 according to an embodiment of the invention. The wireless receiving apparatus 250 may at least be represented by functional components shown in FIG. 5. The wireless receiving apparatus 250 may at least include, but is not limited to, a receiving module 253, a processing circuit 256, a storage module 255, and one or more antenna units 252. The receiving module 253 includes a single branch receiver (e.g., only including an in-phase path or a quadrature-phase path). The receiving module 253 may also perform operations such as low-pass amplification, impedance matching, frequency mixing, down conversion, filtering, amplification, analog-to-digital conversion, and other similar operations. The receiving module 253 may be integrated into a chip or implemented as an independent component or module, and the transmitting module 253 may be implemented as hardware or software.

The storage module 255 may be a static or mobile random access memory (RAM), read-only memory (ROM), flash memory, hard drive, other similar apparatuses, or a combination of the aforesaid apparatuses.

The processing circuit 256 is configured to process digital signals and perform a method of data allocation according to an exemplary embodiment of the invention. In addition, the processing circuit 256 is coupled to the storage module 255 to store programming codes, configuration of apparatus, codebook, buffer or permanent data. In addition, the storage module 215 may also record a plurality of modules executed by the processing circuit 256. For example, the processing circuit 256 may load a digital signal processing module for signal processing such as generating data streams, coding, serial-to-parallel and/or parallel-to-serial conversion, constellation mapping, demodulating, channel estimation, equalization, synchronization, Fourier transformation, symbol detecting, etc. Alternatively, the processing circuit 256 may load a communication signaling processing module, so as to control signaling messages based on related communication technologies.

The function of the processing circuit 256 may be implemented by using a programmable unit such as a microprocessor, a micro-controller, a digital signal processing chip, a field programmable gate array, etc. The function of the processing circuit 256 may also be implemented by using an independent electronic apparatus or an integrated circuit (IC). Besides, the processing circuit 256 may also be implemented as hardware or software. It should be noted that, based on the design needs of people using the embodiments of the invention, the wireless receiving apparatus 250 may have one or more processing circuits 256 to integrate or separately deal with the function of a modem and functions of sensing and displaying, etc. The invention does not intend to impose limitations in this regard.

Figure 6:
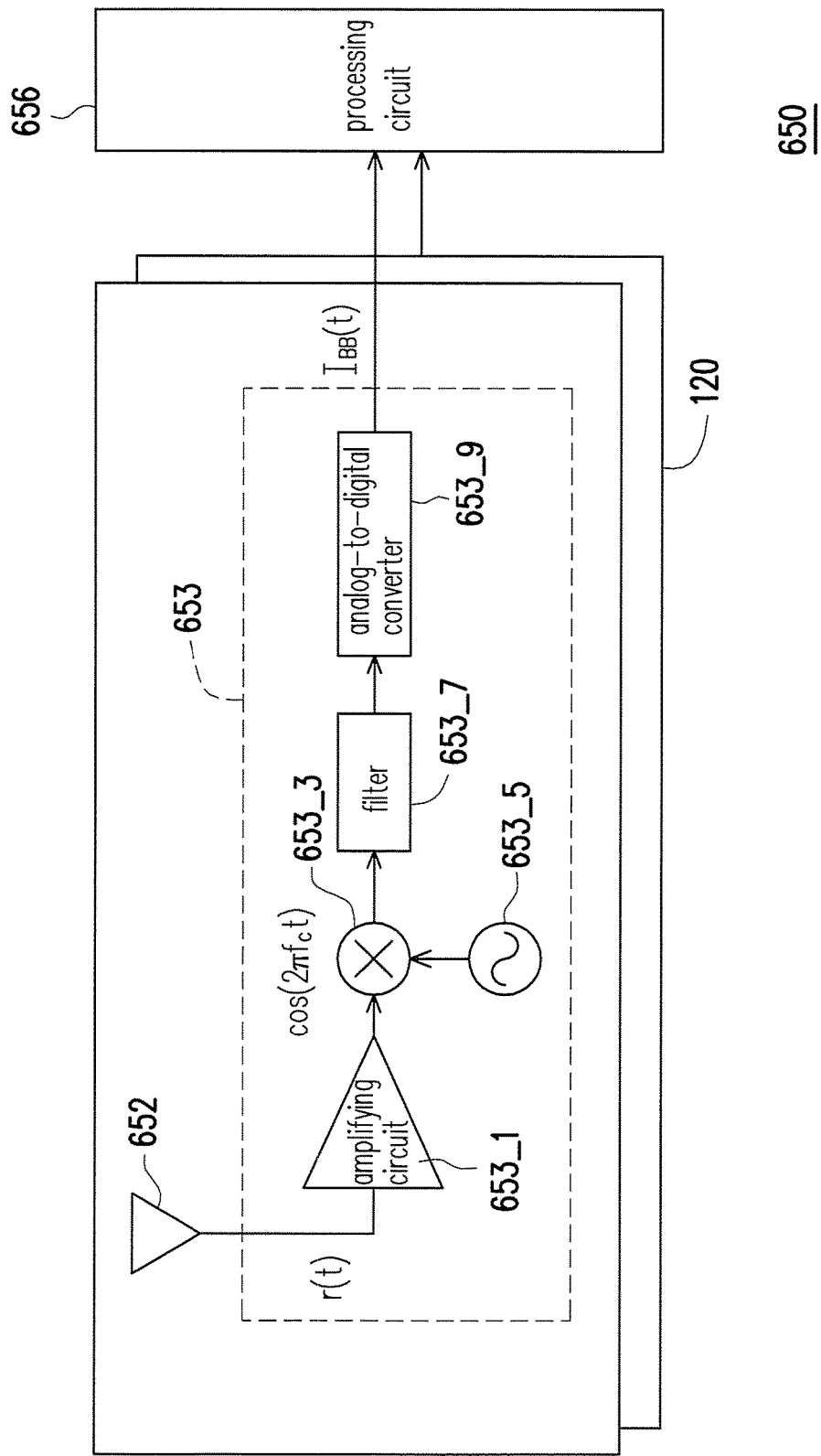
FIG. 6 is a schematic diagram illustrating a circuit of a wireless transmitting apparatus according to an embodiment of the invention.

FIG. 6 is a schematic diagram illustrating a circuit of a wireless transmitting apparatus according to an embodiment of the invention. Referring to FIG. 6, a wireless receiving apparatus 650 includes an antenna unit 652, a transmitting module 653, and a processing circuit 656. The receiving module 653 includes a single branch receiver having an amplifying circuit 653_1, a frequency mixer 653_3, an oscillation generator 653_5, a filter 653_7, and an analog-to-digital converter 653_9. The amplifying circuit 653_1 receives a radio frequency signal (r(t)). The frequency mixer 653_3 down converts the radio frequency signal based on a carrier frequency generated by the oscillation generator 653_5 (i.e., multiplying $\cos(2\pi f_c t)$ by using a multiplier). The filter 653_7 filters (by performing low-pass filtering, band-pass filtering, or filtering at a specific frequency or at a specific frequency band, for example) the down converted radio frequency signal. Moreover, the analog-to-digital converter 653_9 converts the filtered radio frequency signal into a baseband signal $I_{BB}(t)$. Then, the receiving module 653 outputs the baseband signal to the processing circuit 656.

Referring to FIGS. 1 and 6, it should be noted that, as compared with the dual branch OFDM receiver in FIG. 1, the receiving module 653 only uses the in-phase path without using the quadrature-phase path. In this way, the hardware cost is reduced. In some other embodiments, it is also plausible that the receiving module 253 only uses the quadrature-phase path (e.g., the quadrature-phase path 155 of FIG. 1) without using the in-phase path. Besides the wireless receiving module 650 may also have a plurality of the antenna units 652 and the corresponding receiving modules 653. The invention does not intend to limit the numbers of the antenna units 652 and the transmitting modules 653.

Figure 7:
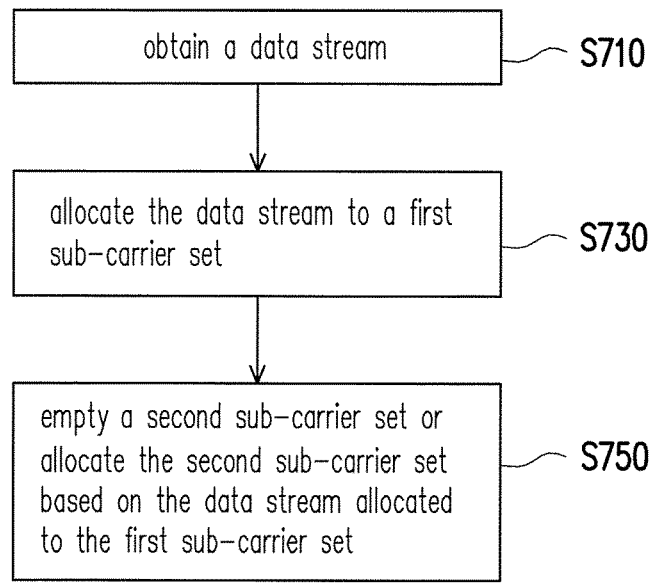
FIG. 7 is flowchart illustrating a method of data allocation according to an embodiment of the invention.

To better describe the operational flow of the embodiments of the invention, several embodiments are described in detail in the following to set forth a method of data allocation and a method of signal receiving according to the embodiments of the invention. FIG. 7 is flowchart illustrating a method of data allocation according to an embodiment of the invention. Referring to FIG. 7, the method of this embodiment is suitable for the wireless transmitting apparatuses 210 and 410. In the following, the control method of the embodiment of the invention is described with reference to the respective components of the wireless transmitting apparatuses 210 and 410. Steps in the method may be correspondingly modified based on the actual situation, and are not limited to the following.

At Step 710, the processing circuit 216 obtains a data stream. Specifically, the processing circuit 216 converts a bit string from serial into parallel. Then, based on the number of sub-carriers (or Fourier computation points, such as 128, 256, or 1024, etc,) and adopted coding/modulation, the bit string is modulated (through phase-shift keying (PSK) differential phase-shift keying (DPSK), quadrature amplitude modulation (QAM), and quadrature phase-shift keying (QPSK), etc., for example) into a complex data stream. For example, a bit string 111001 is modulated into 1+j, 1−j, −1+j after modulation if QPSK modulation is used.

It should be noted that, based on different design needs, part or all the data in the data steam may also be specific pilot signals. The invention does not intend to limit the way that the data stream is generated.

At Step S730, the processing circuit 216 allocates the data stream to a first sub-carrier set. All the sub-carriers are divided into the first sub-carrier set and a second sub-carrier set, and the first and second sub-carrier sets respectively have sub-carriers with opposite frequencies to each other. Specifically, it is assumed that an OFDM symbol in the N point (e.g., 64, 512, or 1024, etc.,) fast Fourier transformation may be represented in the time domain as Formula (1):

$$d(t) = \sum_{k=-\frac{N}{2}+1}^{N/2} s_k e^{j2\pi k f_d t} \quad (1)$$

Here, $s_k$ is data allocated to a sub-carrier index k (i.e., a modulation signal carried by a $k^{th}$ sub-carrier), $f_d$ is a sub-carrier spacing, $1/f_d$ is a symbol period, and t is a time variable.

In this embodiment, based on Formula (1), the first sub-carrier set includes the first sub-carrier to the $(N/2)-1^{th}$ sub-carrier, and the second sub-carrier set includes the $-(N/2)+1^{th}$ sub-carrier to the $-1^{st}$ sub-carrier. Namely, the first sub-carrier set includes positive sub-carrier indices, and the second sub-carrier set includes negative sub-carrier indices. The processing circuit 216 allocates data in the data stream in the subset of the first sub-carrier to the $N/2^{th}$ sub-carrier in the first sub-carrier set. For example, assuming that N is 8 and the data stream includes −1+j, 1−j, 1+j . . . , then −1+j is allocated to the first sub-carrier of the first sub-carrier set and 1−j is allocated to the second sub-carrier of the first sub-carrier set. Alternatively, −1+j is allocated to the second sub-carrier of the first sub-carrier set, and 1−j is allocated to the first sub-carrier of the first sub-carrier set.

At Step S750, the processing circuit 216 empties the second sub-carrier set allocates the second sub-carrier set based on the data stream allocated to the first sub-carrier set. Specifically, to prevent the receiving module 253 having a single branch receiver from being influenced by the inter-carrier interference, derivation is made in the embodiment of the invention based on the formulae of the received signals representing the data stream flowing through the components and the modules of the wireless transmitting apparatus 210 and the wireless receiving apparatus 250, so as to draw the conclusion that the data signal carried by the sub-carrier −n may interfere the data signal carried by the sub-carrier n. Therefore, allocating data carried by the sub-carriers in the second sub-carrier set would be according to the conclusion.

In the following, details concerning the wireless transmitting apparatus 210 are described. Based on Step S750, the OFDM symbol output by the processing circuit 216 to the transmitting module 213 may be represented as Formula (1). Then, referring to FIG. 4, after the up conversion by the frequency mixers 413_3 and 413_5 and the multiplexing by the multiplexer 413_7, the OFDM symbol output by the antenna unit 412 may be represented as Formula (2):

$$s(t)=Re(d(t))\cos(2\pi f_c t)-Im(d(t))\sin(2\pi f_c t)=0.5(d(t)+d^*(t))\cos(2\pi f_c t)-j0.5(d(t)-d^*(t))\sin(2\pi f_c t) \quad (2)$$

(.)* refers to a conjugate value of an argument. Thus, Formula (3) is obtained after performing complex conjugate computation to the OFDM symbols (as represented in Formula (1)) output to the transmitting module 213.

$$d^*(t) = \text{conjugate}(d(t)) = \sum_{k=-\frac{N}{2}+1}^{N/2} s_k^* e^{-j2\pi k f_d t} \quad (3)$$

Then, details concerning the wireless receiving apparatus 250 are described in the following. If a wireless channel that an OFDM signal emitted by the wireless transmitting apparatus 210 passes has a single tap impulse response h(t)=αδ(t−τ) where α is an attenuation parameter at an arbitrary positive value, while τ is a delay time parameter at an positive value. Referring to FIG. 6, the radio frequency signal after being received by the antenna unit 652 may be represented in Formula (4).

$$r(t)=0.5\alpha(d(t)+d^*(t))\cos(2\pi f_c t+\theta)-0.5\alpha j(d(t)-d^*(t))\sin(2\pi f_c t+\theta) \quad (4)$$

$\theta=-2\pi f_c \tau$ represents a phase shift due to a channel delay.

It should be noted that, to make the description simpler, the value of τ is assumed to be very small to make d(t)≈d(t−τ), and it is assumed that α=1 However, the invention is not limited thereto. Besides, the wireless channel is described as a single tap impulse response also for the ease of description. The embodiments of the invention are extensively applicable to circumstances with a multi-tap impulse response (i.e., multi-path channel) and a long delay time (e.g., tens of sample durations). Namely, τ may be greater than a single sampling assumed in most OFDM-based systems.

An output signal $r_1(t)$ after the radio frequency signal is processed by the frequency mixer of the in-phase path may be represented as Formula (5):

$$r_1(t)=0.5(d(t)+d^*(t))\cos(2\pi f_c t+\theta)\cos(2\pi f_c t)-j0.5(d(t)-d^*(t))\sin(2\pi f_c t+\theta)\cos(2\pi f_c t)=0.25(d(t)+d^*(t))\cos(\theta)+0.25(d(t)+d^*(t))\cos(4\pi f_c t+\theta)-j0.25(d(t)-d^*(t))\sin(\theta)-j0.25(d(t)-d^*(t))\sin(4\pi f_c t+\theta) \quad (5)$$

Then, an output signal $r_L(t)$ of the signal $r_1(t)$ processed by the filter 653_7 may be represented as Formula (6).

$$r_L(t)=0.25(d(t)+d^*(t))\cos(\theta)-0.25j(d(t)-d^*(t))\sin(\theta)=0.25d(t)e^{-2\pi\theta}+0.25d^*(t)e^{2\pi\theta} \quad (6)$$

In addition, Formula (3) may be equivalent to Formula (7):

$$d^*(t)=\sum_{k=-\frac{N}{2}+1}^{N/2} s_k^* e^{-j2\pi k f_d t}=\sum_{k=-\frac{N}{2}+1}^{N/2} s_{-k}^* e^{j2\pi k f_d t} \quad (7)$$

By combining Formulae (1) and (7) with Formula (6), a linear combination of a sub-carrier $$e^{j2\pi k f_d t}\left(k \in \left\{-\frac{N}{2}+1, \ldots, \frac{N}{2}\right\}\right)$$

may be obtained. In other words, by substituting Formulae (1) and (7) into Formula (6), Formula (8) is obtained:

$$r_L(t)=0.25\sum_{k=-\frac{N}{2}+1}^{N/2}(s_k e^{j\theta}+s_{-k}^* e^{-j\theta})e^{j2\pi k f_d t} \quad (8)$$

Since Formula (8) may also be represented by the linear combination of the sub-carrier $$e^{j2\pi k f_d t}\left(k \in \left\{-\frac{N}{2}+1, \ldots, \frac{N}{2}\right\}\right),$$

a signal that Formula (8) represents may also be an OFDM signal. When the processing circuit 256 or 656 proceeds to sample and perform the Fourier transformation (e.g., fast Fourier transformation, discrete Fourier transformation, etc.,) to the signal $r_L(t)$, a frequency domain signal received by the $k^{th}$ sub-carrier may be represented as Formula (9):

$$r_k=0.25s_k e^{-j\theta}+0.25s_{-k}^* e^{j\theta} \quad (9)$$

Based on Formula (9), it can be known that if the receiving module 253 only has the in-phase path (without having the quadrature-phase path), receiving a signal in a frequency domain of the sub-carrier k may be interfered by the sub-carrier −k. Thus, to make the OFDM-based wireless receiving apparatus 250 having only the in-phase path operable, a method of data allocation according to an embodiment of the invention is provided in the following.

Figure 8:
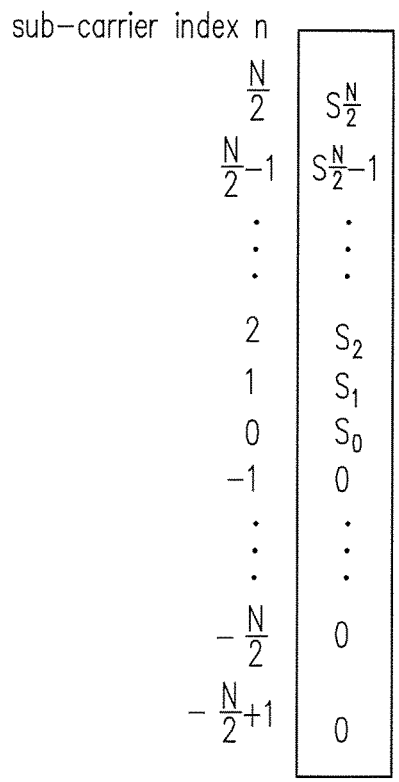
FIG. 8 is a schematic diagram illustrating data allocation.

In an embodiment, the processing circuit 216 sets the sub-carriers in the second sub-carrier set as null sub-carrier. Specifically, in a designated single OFDM symbol, it is assumed that the processing circuit 216 allocates a modulation signal $s_k$ to the $k^{th}$ sub-carrier (included in the first sub-carrier set) of the positive sub-carrier index (as in Step S730), and the $-k^{th}$ sub-carrier (included in the second sub-carrier set) of the negative sub-carrier index is set as a null sub-carrier. In other words, $s_{-k}=0$, the data carried by the $-k^{th}$ sub-carrier in the second sub-carrier set are all null. Referring to a schematic diagram illustrating data allocation as shown in FIG. 8, data of the sub-carrier indices n, where n ranges from n=−1 to n=−(N/2)+1, are all null values. Thus, at the wireless receiving apparatus 250, the received signal of the $k^{th}$ sub-carrier may be represented as Formula (10):

$$r_k=0.25s_k e^{-j\theta} \quad (10)$$

The received signal is not interfered by a negative frequency, and the processing circuit 256 may further proceed to demodulate or decode, so as to restore the data stream.

Figures 9, 10:
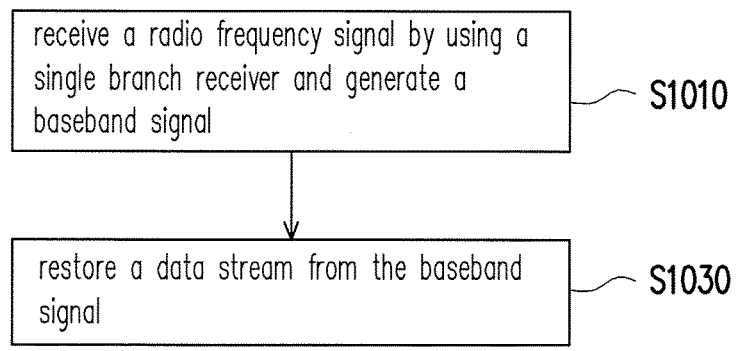
FIG. 9 is a schematic diagram illustrating data allocation.
FIG. 10 is flowchart illustrating a method of signal receiving according to an embodiment of the invention.

In another embodiment, the processing circuit 216 performs complex conjugate computation to the data stream allocated to the first sub-carrier set, and the data stream after the complex conjugate computation is allocated to the second sub-carrier set. In this embodiment, the processing circuit 216 allocates data of an $m^{th}$ sub-carrier that after the conjugate computation to an −mth sub-carrier in the second sub-carrier set. Here, m is from 1 to (N/2)−1. Specifically, in the designated single orthogonal frequency division symbol, it is assumed that the processing circuit 216 allocates a modulation signal $s_m$ to the mth sub-carrier (included in the first sub-carrier set) of the positive sub-carrier index (as Step S730), and the −mth sub-carrier (included in the second sub-carrier set) of the negative sub-carrier index is set as a conjugate value of the modulation signal carried by the mth sub-carrier, namely $s_{-m}=s_m^*$. Referring to a schematic diagram illustrating data allocation as shown in FIG. 9, data of the sub-carrier indices n, where n ranges from n=−1 to n=−(N/2)+1, are respectively conjugate values of data carried by the sub-carrier indices, where n from n=1 to n=(N/2)−1. Thus, at the wireless receiving apparatus 250, the received signal of the $k^{th}$ sub-carrier may be represented as Formula (11):

$$r_k=0.25s_k \cos(\theta) \quad (11)$$

The received signal is not interfered by a negative frequency, either, and the processing circuit 256 may further proceed to demodulate and decode, so as to restore the data stream.

After allocating all the sub-carriers based on the method of data allocation, the processing circuit 216 converts the allocated data stream into the OFDM signal. Specifically, the processing circuit may perform N-point (i.e., the total number of the sub-carriers) inverse Fourier transformation (e.g., IFT, DFT, etc.,), so as to add up the data carried by the sub-carriers, thereby forming the OFDM symbol. Then, as time changes, several consecutive OFDM symbols form an OFDM signal, and the OFDM signal is output to the transmitting module 213 through the processing circuit 216. Finally, the transmitting module 213 transmits the OFDM signal to the external environment (e.g., transmitting to the wireless receiving apparatus 250) through the antenna unit 212.

In another perspective, FIG. 10 is flowchart illustrating a method of signal receiving according to an embodiment of the invention. Referring to FIG. 10, the method of this embodiment is suitable for the wireless receiving apparatuses 250 and 650. In the following, the control method of the embodiment of the invention is described with reference to the respective components of the wireless transmitting apparatuses 250 and 650. Steps in the method may be correspondingly modified based on the actual situation, and are not limited to the following.

At Step S1010, the receiving module 253 receives a radio frequency signal through a single branch receiver and generates a baseband signal. All the sub-carriers are divided into the first sub-carrier set and the second sub-carrier set, and the radio frequency signal includes the OFDM signal carried by the first sub-carrier set and the second sub-carrier set, and the second sub-carrier set is emptied or allocated based on data of the first sub-carrier set. At Step S1030, the processing circuit 256 restores the data stream from the baseband signal. Details concerning Steps S1010 and S1030 may be referred to Steps S730 to S750 in FIG. 7, and thus will not be reiterated hereinafter. In other words, if the receiving module 253 receives the OFDM signal generated based on the method of data allocation, the inter-carrier interference does not occur. Besides, the processing circuit 256 may further restore the data of the original data stream $s_k$ from the received signal $r_k$ based on the chosen method of data collocation. For example, the processing circuit 256 may obtain a phase shift θ based on a channel estimation technology, so as to effectively restore the data stream.

It should be noted that, based on Formulae (10) and (11), it can be known that the received signal $r_k$ may be with amplitude attenuation. People using the embodiments of the invention may further multiply an amplitude of the data stream with a multiple (e.g., 4, 4/N, etc.,) by using the processing circuit 216, amplify based on a gain (e.g., 4, 4/N, etc.,) by using an amplifying circuit in the transmitting module 213, amplify based on a gain by using an amplifying circuit 653_1 of the transmitting module 213, multiply the received signal $r_k$ with a multiple by using the processing circuit 216, etc. However, the invention is not limited thereto. In addition Steps S730 to S750 in FIG. 7 are described with the in-phase path only. However, in other embodiments, the method of data allocation according to the embodiments of the invention is also applicable for receiving only with the quadrature-phase path.

In view of the foregoing, the wireless receiving apparatus according to the embodiments of the invention only includes the single branch receiver, so as to prevent the in-phase/quadrature-phase imbalance in the conventional dual branch receiver and simplify the hardware structure. Thus, the wireless receiving apparatus according to the embodiment is applicable in low-cost wireless communication apparatus used in the Internet of Things (IoT) (which may include machine type communication (MTC) and device-to-device (D2D) communication). In addition, to avoid the inter-carrier interference in the wireless receiving apparatus having only the single branch receiver, the wireless transmitting apparatus is used in the embodiments of the invention to set a portion of the sub-carriers as null sub-carriers or as conjugate values of the other portion of the sub-carriers. Accordingly, the wireless receiving apparatus according to the embodiments of the invention may operate effectively without inter-carrier interference.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of data allocation, suitable for a wireless transmitting apparatus, wherein the wireless transmitting apparatus transmits through a plurality of sub-carriers based on an orthogonal frequency division multiplexing (OFDM) technology, the method comprising:

obtaining a data stream;

allocating the data stream to a first sub-carrier set, wherein all the sub-carriers are divided into the first sub-carrier set and a second sub-carrier set, and the first sub-carrier set and the second sub-carrier set respectively have the sub-carriers with opposite frequencies to each other, wherein the number of the sub-carriers is N, the first sub-carrier set comprises a first sub-carrier to an $(N/2)-1^{th}$ sub-carrier, the second sub-carrier set comprises an $-(N/2)+1^{th}$ sub-carrier to a $-1^{st}$ sub-carrier; and emptying the second sub-carrier set or allocating the second sub-carrier set based on the data stream allocated to the first sub-carrier set, wherein the method of allocating the second sub-carrier set comprises performing a complex conjugate computation to the data stream allocated to the first sub-carrier set, and allocating the data stream after the complex conjugate computation to the second sub-carrier set, wherein allocating data stream after the complex conjugate computation in an mth sub-carrier in the first sub-carrier set to an −mth sub-carrier in the second sub-carrier set, wherein m is from 1 to (N/2)−1.

2. The method of data allocation as claimed in claim 1, wherein the step of emptying the second sub-carrier set or allocating the second sub-carrier set based on the data stream allocated to the first sub-carrier set comprises:

setting the sub-carriers in the second sub-carrier set as a plurality of null sub-carriers.

3. The method of data allocation as claimed in claim 1, wherein after the step of emptying the second sub-carrier set or allocating the second sub-carrier set based on the data stream allocated to the first sub-carrier set, the method further comprises:

converting the allocated data stream into an OFDM signal.

4. A wireless transmitting apparatus, suitable to transmit through a plurality of sub-carriers based on an OFDM technology, the apparatus comprising:

a transmitting module, transmitting an OFDM signal;

a processing circuit, coupled to the transmitting module and configured to perform the following:

obtaining a data stream;

allocating the data stream to a first sub-carrier set, wherein all the sub-carriers are divided into the first sub-carrier set and a second sub-carrier set, and the first sub-carrier set and the second sub-carrier set respectively have the sub-carriers with opposite frequencies to each other, wherein the number of the sub-carriers is N, the first sub-carrier set comprises a first sub-carrier to an $(N/2)-1^{th}$ sub-carrier, the second sub-carrier set comprises an $-(N/2)+1^{th}$ sub-carrier to a $-1^{st}$ sub-carrier;

emptying the second sub-carrier set or allocating the second sub-carrier set based on the data stream allocated to the first sub-carrier set, wherein the processing circuit performs a complex conjugate computation to the data stream allocated to the first sub-carrier set, and allocates the data stream after the complex conjugate computation to the second sub-carrier set, wherein the processing circuit allocates data stream after the complex conjugate computation in an mth sub-carrier in the first sub-carrier set to an −mth sub-carrier in the second sub-carrier set, wherein m is from 1 to (N/2)−1; and converting the data stream allocated to the first sub-carrier set and the second sub-carrier set into the OFDM signal, so as to transmit the OFDM signal through the transmitting module.

5. The wireless transmitting apparatus as claimed in claim 4, wherein the processing circuit is further configured to perform the following:

setting the sub-carriers in the second sub-carrier set as a plurality of null sub-carriers.

6. The wireless transmitting apparatus as claimed in claim 4, wherein the processing circuit is further configured to perform the following:
converting the allocated data stream into the OFDM signal.

7. A wireless receiving apparatus, suitable to receive through a plurality of sub-carriers based on an OFDM technology, the apparatus comprising:
a receiving module, comprising a single branch receiver that receives a radio frequency signal and outputs a baseband signal, wherein all the sub-carriers are divided into a first sub-carrier set and a second sub-carrier set, the radio frequency signal comprises an OFDM signal carried by the first sub-carrier set and the second sub-carrier set, wherein the number of the sub-carriers is N, the first sub-carrier set comprises a first sub-carrier to an $(N/2)-1^{th}$ sub-carrier, the second sub-carrier set comprises an $-(N/2)+1^{th}$ sub-carrier to a $-1^{th}$ sub-carrier and the second sub-carrier set is emptied or allocated based on data of the first sub-carrier set, wherein in response to the second sub-carrier set is allocated based on data of the first sub-carrier set, data carried by the sub-carriers in the second sub-carrier set are conjugate with respect to data carried by the sub-carriers in the first sub-carrier set and data carried by an $-$mth sub-carrier in the second sub-carrier set are conjugate with respect to data carried by an mth sub-carrier in the first sub-carrier set, wherein m is from 1 to $(N/2)-1$; and
a processing circuit, coupled to the receiving module and configured to perform the following:
restoring a data stream from the baseband signal.

8. The wireless receiving apparatus as claimed in claim 7, wherein the single branch receiver is only used for one of an in-phase path and a quadrature-phase path, and the single branch receiver comprises:
an amplifying circuit, receiving the radio frequency signal through an antenna unit;
an oscillation generator, generating a carrier frequency;
a frequency mixer, coupled to the amplifying circuit and the oscillation generator, and configured to perform down conversion to the radio frequency signal based on the carrier frequency;
a filter, filtering the down converted radio frequency signal; and
an analog-to-digital converter, coupled to the filter and configured to convert the filtered radio frequency signal into the baseband signal.

9. The wireless receiving apparatus as claimed in claim 7, wherein in the OFDM signal, each of the sub-carriers in the second sub-carrier set carries a null value.

10. A method of signal receiving, suitable for a wireless receiving apparatus, wherein the wireless receiving apparatus receives through a plurality of sub-carriers based on an OFDM technology, and the method comprises:
receiving a radio frequency signal through a single branch receiver and generating a baseband signal, wherein all the sub-carriers are divided into a first sub-carrier set and a second sub-carrier set, the radio frequency signal comprises an orthogonal frequency division multiplexing signal carried by the first sub-carrier set and the second sub-carrier set, wherein the number of the sub-carriers is N, the first sub-carrier set comprises a first sub-carrier to an $(N/2)-1^{th}$ sub-carrier, the second sub-carrier set comprises an $-(N/2)+1^{th}$ sub-carrier to a $-1^{th}$ sub-carrier and the second sub-carrier set is emptied or allocated based on data of the first sub-carrier set, wherein in response to the second sub-carrier set is allocated based on data of the first sub-carrier set, data carried by the sub-carriers in the second sub-carrier set are conjugate with respect to data carried by the sub-carriers in the first sub-carrier set and data carried by an $-$mth sub-carrier in the second sub-carrier set are conjugate with respect to data carried by an mth sub-carrier in the first sub-carrier set, wherein m is from 1 to $(N/2)-1$; and
restoring a data stream from the baseband signal.

11. The method of signal receiving as claimed in claim 10, wherein the single branch receiver is only used for one of an in-phase path and a quadrature-phase path.

12. The method of signal receiving as claimed in claim 10, wherein in the OFDM signal, each of the sub-carriers in the second sub-carrier set carries a null value.

* * * * *